US010079517B2

(12) United States Patent
Kusase

(10) Patent No.: US 10,079,517 B2
(45) Date of Patent: Sep. 18, 2018

(54) OUTER ROTOR-TYPE ROTATING ELECTRIC MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 201 days.

(21) Appl. No.: 15/003,887

(22) Filed: Jan. 22, 2016

(65) Prior Publication Data

US 2016/0218571 A1 Jul. 28, 2016

(30) Foreign Application Priority Data

Jan. 22, 2015 (JP) .................................. 2015-010313

(51) Int. Cl.
| | | |
|---|---|---|
| *H02K 1/16* | (2006.01) | |
| *H02K 1/27* | (2006.01) | |
| *H02K 3/28* | (2006.01) | |

(52) U.S. Cl.
CPC ........... *H02K 1/165* (2013.01); *H02K 1/2786* (2013.01); *H02K 2213/03* (2013.01)

(58) Field of Classification Search
CPC .. H02K 1/165; H02K 1/2786; H02K 2213/03; H02K 3/28
USPC .................................................... 310/156.49
See application file for complete search history.

(56) References Cited

U.S. PATENT DOCUMENTS

| | | | | | |
|---|---|---|---|---|---|
| 5,504,381 | A | * | 4/1996 | Kato ..................... | B65H 51/06 310/51 |
| 7,839,045 | B2 | * | 11/2010 | Wu ........................ | H02K 29/03 310/156.38 |
| 2009/0134732 | A1 | * | 5/2009 | Shichijoh ............... | H02K 1/246 310/156.53 |
| 2009/0218907 | A1 | * | 9/2009 | Kusase ................ | H02K 21/044 310/263 |
| 2010/0090549 | A1 | * | 4/2010 | Gerstler .................. | H02K 3/24 310/58 |
| 2010/0090557 | A1 | * | 4/2010 | El-Refaie ............... | H02K 1/146 310/198 |
| 2010/0237723 | A1 | * | 9/2010 | Gerstler .................. | H02K 3/24 310/59 |
| 2011/0025140 | A1 | * | 2/2011 | Pennander .......... | H02K 1/2786 310/44 |

(Continued)

FOREIGN PATENT DOCUMENTS

| | | |
|---|---|---|
| JP | H10-178753 A | 6/1998 |
| JP | 2002-233122 A | 8/2002 |
| JP | 2012-039720 A | 2/2012 |

*Primary Examiner* — Alex W Mok
(74) *Attorney, Agent, or Firm* — Oliff PLC

(57) ABSTRACT

An outer rotor-type rotating electric machine includes a rotor and a stator. The rotor includes a plurality of magnets each of which extends in a circumferential direction of the rotor and is magnetized in a radial direction of the rotor. The stator is disposed radially inside the rotor. The stator has a plurality of stator teeth formed in a radial pattern. Each of the stator teeth has an inner circumferential width at its radially inner end and an outer circumferential width at its radially outer end. Moreover, the following relationship is satisfied: Wi/Wo≥0.6, where Wi is the inner circumferential width and Wo is the outer circumferential width of each of the stator teeth.

6 Claims, 8 Drawing Sheets

(56) References Cited

U.S. PATENT DOCUMENTS

| | | | | |
|---|---|---|---|---|
| 2011/0084634 A1* | 4/2011 | Kusase | ............... | H02K 21/044 318/400.02 |
| 2012/0025658 A1* | 2/2012 | Watanabe | ............... | H02K 3/12 310/179 |
| 2012/0126652 A1* | 5/2012 | Shah | ............... | H02K 1/2786 310/156.12 |
| 2013/0313936 A1* | 11/2013 | Shibata | ............... | H02K 1/27 310/156.43 |

* cited by examiner

OUTER ROTOR-TYPE ROTATING ELECTRIC MACHINE

CROSS-REFERENCE TO RELATED APPLICATION

This application is based on and claims priority from Japanese Patent Application No. 2015-10313 filed on Jan. 22, 2015, the content of which is hereby incorporated by reference in its entirety into this application.

BACKGROUND

1. Technical Field

The present invention relates to outer rotor-type rotating electric machines that include a rotor, which has magnets circumferentially extending and being radially magnetized, and a stator disposed radially inside the rotor.

2. Description of Related Art

Rotating electric machines that include a stator (or armature stator) and a rotor (or field rotor) can be classified into inner rotor-type machines in which the rotor is disposed radially inside the stator and outer rotor-type machines in which the rotor is disposed radially outside the stator.

The outer rotor-type rotating electric machines were originally considered to be higher in performance because they have high-output elements such as higher winding performance and ease in arranging field magnets and securing core magnetic flux passages.

Japanese Patent Application Publication No. JPH10178753A discloses a rotor for a small-sized motor that is of an outer rotor type. The rotor includes a magnetic frame and a yoke which are formed of laminated plates to have a high damping coefficient against shocks.

However, in practice, the conventional outer rotor-type rotating electric machines, including the motor disclosed in the above patent document, are inferior in performance to the inner rotor-type rotating electric machines. Therefore, the outer rotor-type rotating electric machines have hardly been used practically in industry.

SUMMARY

The inventor of the present invention has investigated the causes of the inferior performance of the conventional outer rotor-type rotating electric machines. As a result of the investigation, the following has been found by the inventor.

Magnets and windings (or coils) have the same function as a magnetomotive force source. However, due to the limitations of winding current density, windings generally require a larger space for the same magnetomotive force than magnets. In the outer rotor-type rotating electric machines, the stator is disposed in a radially inner space surround by the rotor. This radially inner space is mostly occupied by windings of the stator, rendering the cross-sectional area of a core of the stator small. That is, compared to the inner rotor-type rotating electric machines, the outer rotor-type rotating electric machines have a smaller magnetic circuit area of the stator core, thus being inferior in performance. Therefore, to improve the performance of the outer rotor-type rotating electric machines, it is necessary to increase the magnetic circuit area of the stator core.

The present invention has been made in view of the above findings of the inventor.

According to the present invention, there is provided an outer rotor-type rotating electric machine which includes a rotor and a stator. The rotor includes a plurality of magnets each of which extends in a circumferential direction of the rotor and is magnetized in a radial direction of the rotor. The stator is disposed radially inside the rotor. The stator has a plurality of stator teeth formed in a radial pattern. Each of the stator teeth has an inner circumferential width at its radially inner end and an outer circumferential width at its radially outer end. Moreover, the following relationship is satisfied: Wi/Wo≥0.6, where Wi is the inner circumferential width and Wo is the outer circumferential width of each of the stator teeth.

With the above configuration, the entire magnetic circuit formed by opposing the rotor and the stator (i.e., the sum of d-axis magnetic flux passages and q-axis magnetic flux passages) is expanded so that field magnetic flux can be supplied to the stator in a range of at least two of every three stator teeth corresponding to one magnetic pole. Moreover, slots formed between the stator teeth are shaped so as to be gradually narrowed radially inward, thereby reliably preventing radially inner end portions (or root portions) of the stator teeth from being completely saturated. Consequently, it becomes possible to solve the technical problem occurring in the prior art, in other words, it becomes possible to increase the magnetic circuit area of a stator core on the radially inner side (or the center side) of the stator, thereby suppressing magnetic saturation of the stator core. As a result, for the same size, the performance of the outer rotor-type rotating electric machine according to the present invention is considerably higher than that of an inner rotor-type rotating electric machine.

In a further implementation of the present invention, the rotor has a plurality of soft-magnetic magnetic flux passages formed therein. Each of the soft-magnetic magnetic flux passages is located between one circumferentially-adjacent pair of the magnets and constitutes one magnetically-neutral non-polar auxiliary pole. In this case, it is preferable that the angular range of each of the soft-magnetic magnetic flux passages is set to be in the range of 50° to 80° in electrical angle.

It is also preferable that the angular range of each of the magnets is set to be greater than or equal to 70° in electrical angle.

The stator has a plurality of slots and a stator coil. Each of the slots is formed between one circumferentially-adjacent pair of the stator teeth. The stator coil is partially received in the slots so as to have a plurality of coil end portions protruding outside the slots on an axial side of the slots. In this case, it is preferable that the coil end portions of the stator coil are assembled together so as to be arranged in alignment with each other.

Each of the slots may be stepped to have the shape of stairs. Further, each of the slots may have first, second and third portions which are sequentially located in this order in a direction from the radially inside to the radially outside of the slot. The first, second and third portions respectively have slot widths W1, W2 and W3 which are distances between one circumferentially-adjacent pair of the stator teeth defining the slot. In this case, it is preferable that the slot widths W1, W2 and W3 are set such that W1:W2:W3=1:2:3.

BRIEF DESCRIPTION OF THE DRAWINGS

The present invention will be understood more fully from the detailed description given hereinafter and from the accompanying drawings of exemplary embodiments, which, however, should not be taken to limit the present invention In the accompanying drawings.

DESCRIPTION OF EMBODIMENTS

Figure 1:
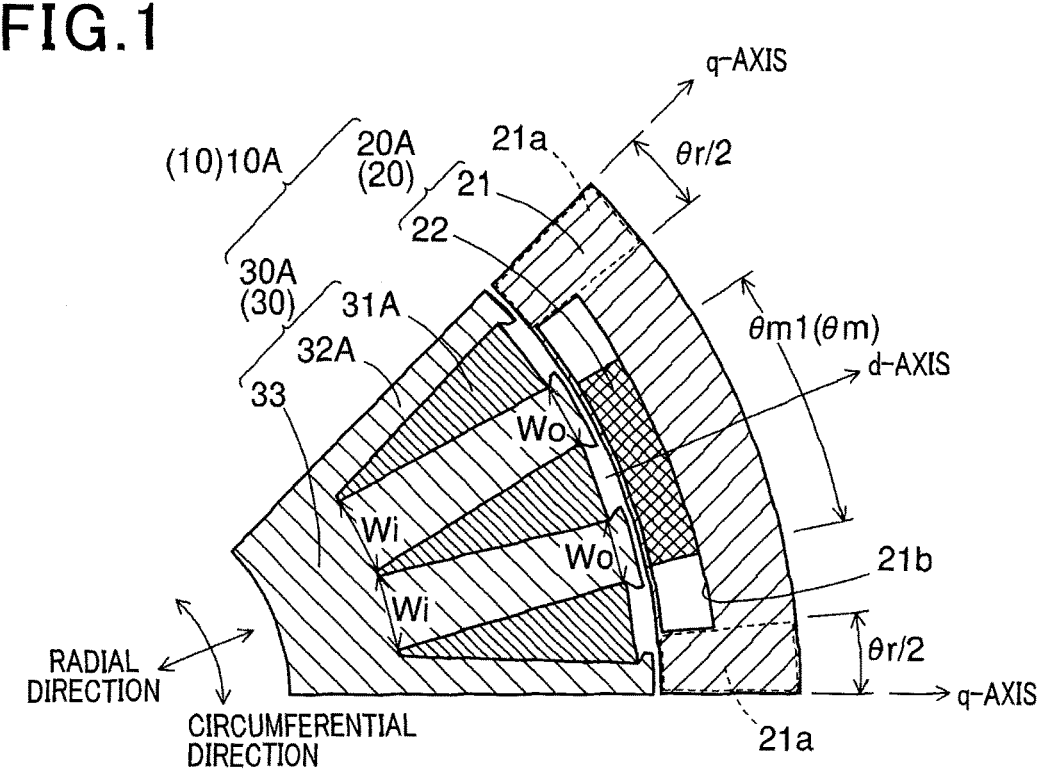
FIG. 1 is a schematic cross-sectional view illustrating the configuration of an outer rotor-type rotating electric machine according to a first embodiment.

Exemplary embodiments will be described hereinafter with reference to FIGS. 1-16. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

An outer rotor-type rotating electric machine 10A according to a first embodiment will be described with reference to FIGS. 1-7. This outer rotor-type rotating electric machine 10A is an example of an outer rotor-type rotating electric machine 10 according to the present invention.

As shown in FIG. 1, the rotating eletric machine 10A includes a rotor 20A and a stator 30A. Moreover, though not shown in the figures, the rotating electric machine 10A also includes other components such as a housing and a rotating shaft. In addition, in FIG. 1, there are also shown a d axis which is the central axis of one magnet 22 and q axes orthogonal to the d axis.

The rotor 20A is an example of a rotor 20 according to the present invention. The rotor 20A includes an annular (or a hollow cylindrical) rotor core 21 and a plurality of magnets 22. The rotor core 21 has a plurality of soft-magnetic magnetic flux passages 21a and a plurality of receiving portions 21b formed therein. Each of the receiving portions 21b has a corresponding one of the magnets 22 received therein. Each of the magnets 22 extends in a circumferential direction of the rotor 20A (i.e., a circumferential direction of the rotor core 21) and is magnetized in a radial direction of the rotor 20A (i.e., a radial direction of the rotor core 21). Each of the soft-magnetic magnetic flux passages 21a is located between one circumferentially-adjacent pair of the magnets 22. Each of the soft-magnetic magnetic flux passages 21a constitutes one magnetically-neutral non-polar auxiliary pole. Each of the aforementioned q axes is set so as to pass through the circumferential center of a corresponding one of the soft-magnetic magnetic flux passages 21a.

It should be noted that for the sake of simplicity, in FIG. 1, there is shown only a part of the rotating electric machine 10A which includes only one of the magnets 22 and corresponds to one magnetic pole of the rotor 20A.

The stator 30A is an example of a stator 30 according to the present invention. The stator 30A includes a multi-phase (e.g., three-phase) stator coil 31A (see FIG. 2) and a stator core 33. The stator coil 31A is an example of a stator coil 31 according to the present invention. A plurality of stator teeth 32A are formed so as to extend radially outward from the stator core 33. The stator teeth 32A are an example of stator teeth 32 according to the present invention. Between each circumferentially-adjacent pair of the stator teeth 32A, there is formed one slot 34A (see FIG. 2) for receiving the stator coil 31A.

Each of the stator teeth 32A has an inner circumferential width Wi at its radially inner end and an outer circumferential width Wo at its radially outer end. The inner and outer circumferential widths Wi and Wo may be set to any suitable values. However, in terms of improving the performance of the rotating electric machine 10A, it is preferable to set the ratio of the inner and outer circumferential widths Wi and Wo as to be described later (see FIG. 5).

Figure 2:
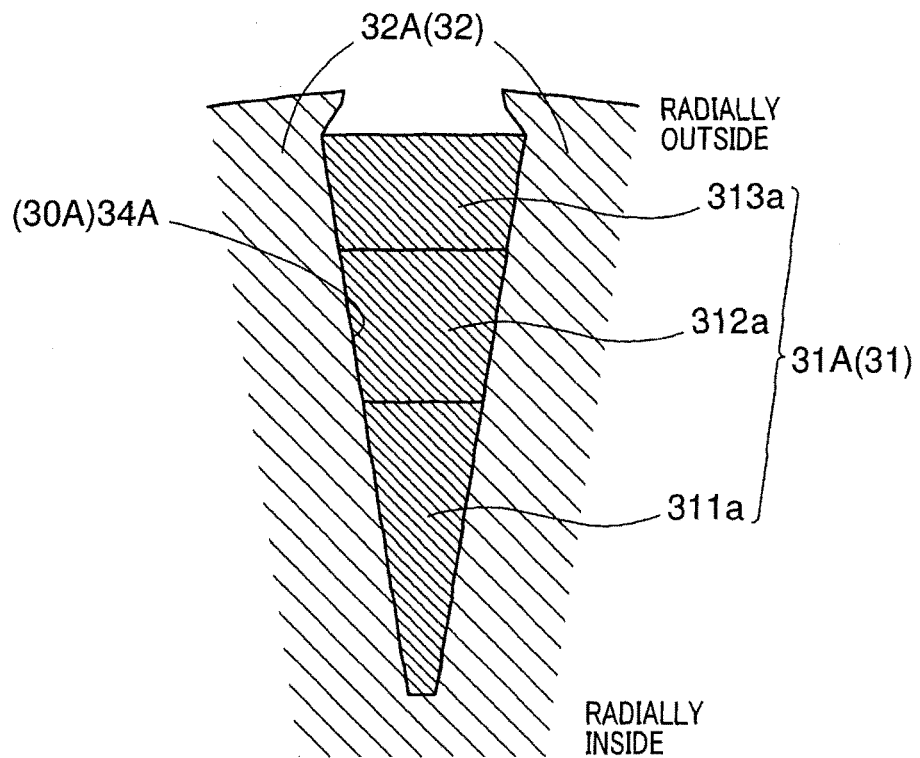
FIG. 2 is a schematic cross-sectional view illustrating a first example of configuring a stator coil.

As shown in FIG. 2, in each of the slots 34A, the stator coil 31A is received in a plurality of layers. The number of the layers may be set to any suitable value. For example, in the present embodiment, the number of the layers is set to 3. Hereinafter, for sake of convenience of explanation, the three layers are sequentially referred to as a first layer, a second layer and a third layer from the radially inside to the radially outside of the slot 34A. In the first layer, there is received a first portion (or radially innermost portion) 311a of the stator coil 31A. In the second layer, there is received a second portion (or radially intermediate portion) 312a of the stator coil 31A. In the third layer, there is received a third portion (or radially outermost portion) 313a of the stator coil 31A. The first, second and third portions 311a, 312a and 313a of the stator coil 31A are shaped in conformity with the shape of the slot 34A so that the cross-sectional areas of the three portions 311a, 312a and 313a are equal to each other.

With the above configuration, it is possible to improve the space factor of the stator coil 31A in each of the slots 34A. Moreover, it becomes difficult for a difference in characteristics (e.g., allowable electric current and resistance value) to occur between the three portions 311a, 312a and 313a of the stator coil 31A. Furthermore, in each of the slots 34A, the center of volume of the stator coil 31A is located closer to the radially outside than to the radially inside of the slot 34A; consequently, it becomes possible to increase the magnetic circuit area of the stator teeth 32A and thus that of the stator core 33.

In addition, it should be noted that insulating members (e.g., an insulating coat and insulating paper) provided between the different portions of the stator coil 31A and between the stator coil 31A and the stator core 33 are omitted from FIG. 2. In practice, the stator coil 31A is covered by an insulating coat or baking-finished with heat-resistant resin. Moreover, insulating paper is interposed between the different portions of the stator coil 31A and between the stator coil 31A and the stator core 33. These insulating members are also omitted from FIGS. 9-10 and 14-16 which will be described later.

Figure 3:
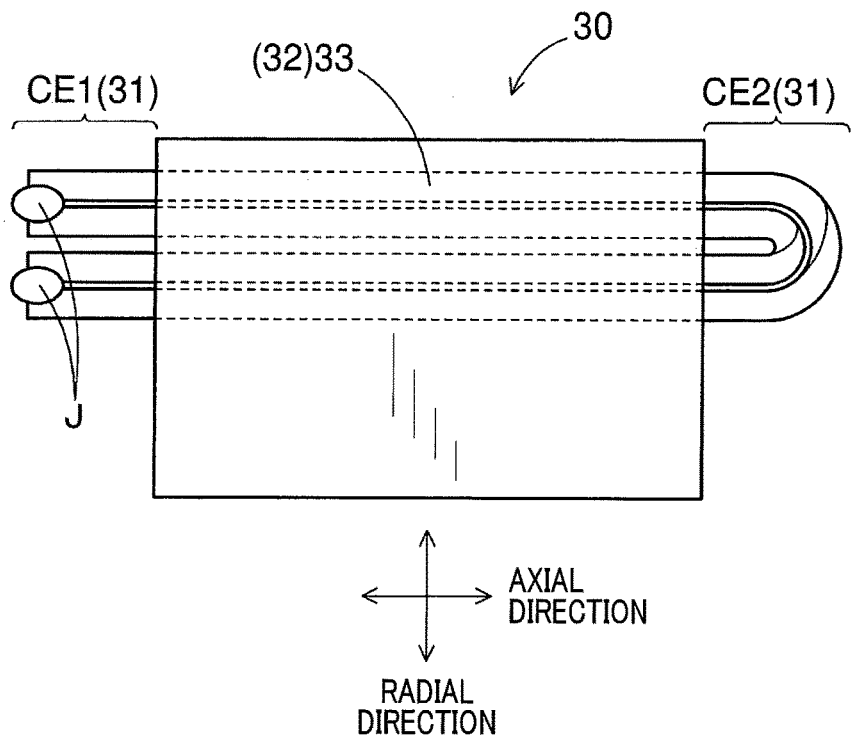
FIG. 3 is a schematic side view illustrating the formation of coil end portions of the stator coil.

FIG. 3 shows coil end portions CE1 and CE2 of the stator coil 31. The coil end portions CE1 protrude outside the slots 34A on one axial side (i.e., the right side in FIG. 3) of the stator core 33, while the coil end portions CE2 protrude outside the slots 34A on the other axial side (i.e., the left side in FIG. 3) of the stator core 33. In the present embodiment, the stator coil 31 is formed of a plurality of U-shaped electric conductor segments. For each of the U-shaped electric conductor segments, a bottom portion (or base portion) of the U-shaped electric conductor segment constitutes one coil end portion CE1, while a pair of end portions of the U-shaped electric conductor segment constitutes a pair of coil end portions CE2. Moreover, the coil end portions CE2 of the stator coil 31 are joined to one another to form joints J therebetween.

Figure 4:
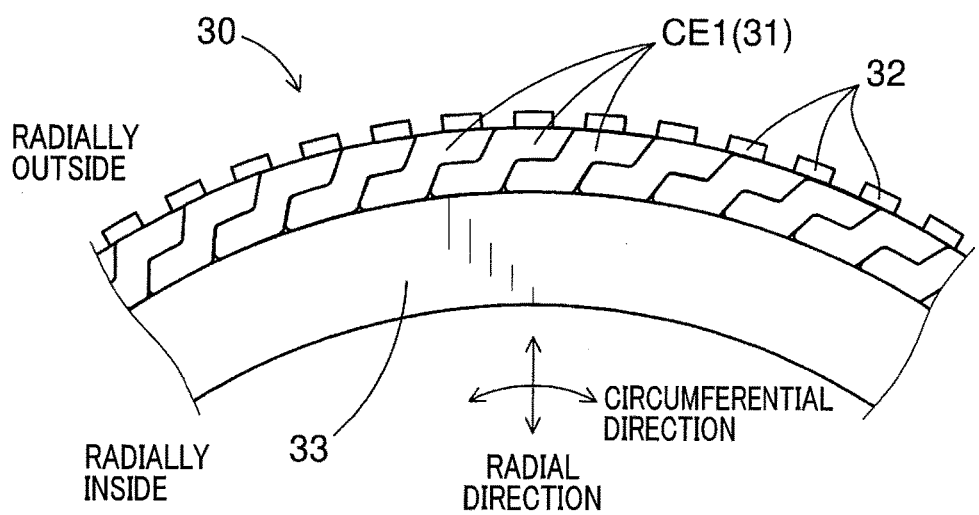
FIG. 4 is a schematic axial end view illustrating the formation of the coil end portions.

FIG. 4 shows the coil end portions CE1 of the stator coil 31 which are located on the front side of FIG. 4, without showing the coil end portions CE2 of the stator coil 31 which are located on the back side of the FIG. 4. As shown in the figure, the coil end portions CE1 of the stator coil 31 are assembled together so as to be arranged in circumferential alignment with each other. With such an arrangement, it is possible to compactly wind the stator coil 31, thereby minimizing the size of the entire stator 30.

Next, the effects of various parameters on the performance of the rotating electric machine 10A will be described with reference to FIGS. 5-7.

Figure 5:
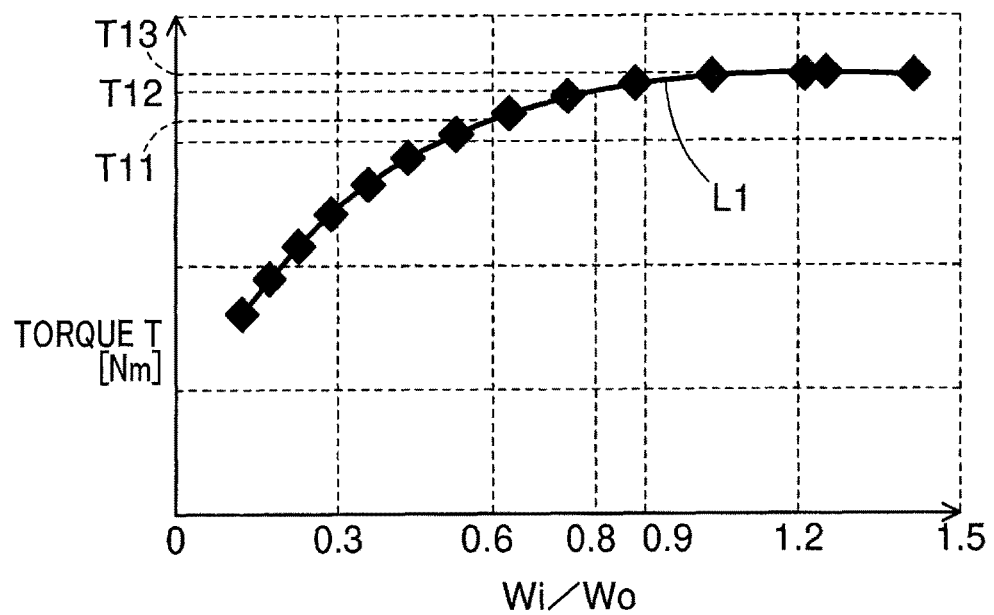
FIG. 5 is a graph illustrating the relationship between torque and width ratio of stator teeth.

First, in FIG. 5, the horizontal axis represents the ratio Wi/Wo (i.e., the ratio of the inner circumferential width Wi of the stator teeth 32A to the outer circumferential width Wo of the stator teeth 32A); the vertical axis represents the torque T generated by the rotating electric machine 10A; the characteristic line L1 represents the relationship between the ratio Wi/Wo and the torque T.

As can be seen from FIG. 5, when the ratio Wi/Wo is equal to 1.2, the torque T is equal to a maximum value T13; when the ratio Wi/Wo is equal to 0.8, the torque T is equal to a value T12 that is lower than T13; when the ratio Wi/Wo is equal to 0.6, the torque T is equal to a value T11 that is lower than T12. To allow at least ⅔ of the total field magnetic flux to flow through the stator teeth 32A, it is preferable to set the ratio Wi/Wo to be higher than or equal to 0.6. Moreover, to enhance the performance of the rotating electric machine 10A, it is preferable to set the ratio Wi/Wo to be higher than or equal to 0.8.

On the other hand, as the ratio Wi/Wo increases above 1.4, the radially outer end portions of the stator teeth 32A gradually decrease in size. Consequently, it becomes easy for magnetic saturation to occur in the stator teeth 32A; thus the amount of magnetic flux flowing between the rotor 20A and the stator 30A is limited.

In view of the above, it is preferable to set the ratio Wi/Wo to be in the range of 0.6 to 1.8 (i.e., $0.6 \leq Wi/Wo \leq 1.8$). Moreover, to enhance the performance of the rotating electric machine 10A, it is preferable to set the ratio Wi/Wo to be in the range of 0.8 to 1.5 (i.e., $0.8 \leq Wi/Wo \leq 1.5$).

In addition, when the ratio Wi/Wo exceeds 1.5, the performance of the rotating electric machine 10A is hardly improved while it becomes difficult to have the stator coil 31A received in the slots 34A. Therefore, it is preferable to limit the ratio Wi/Wo to be lower than or equal to 1.5.

Figure 6:
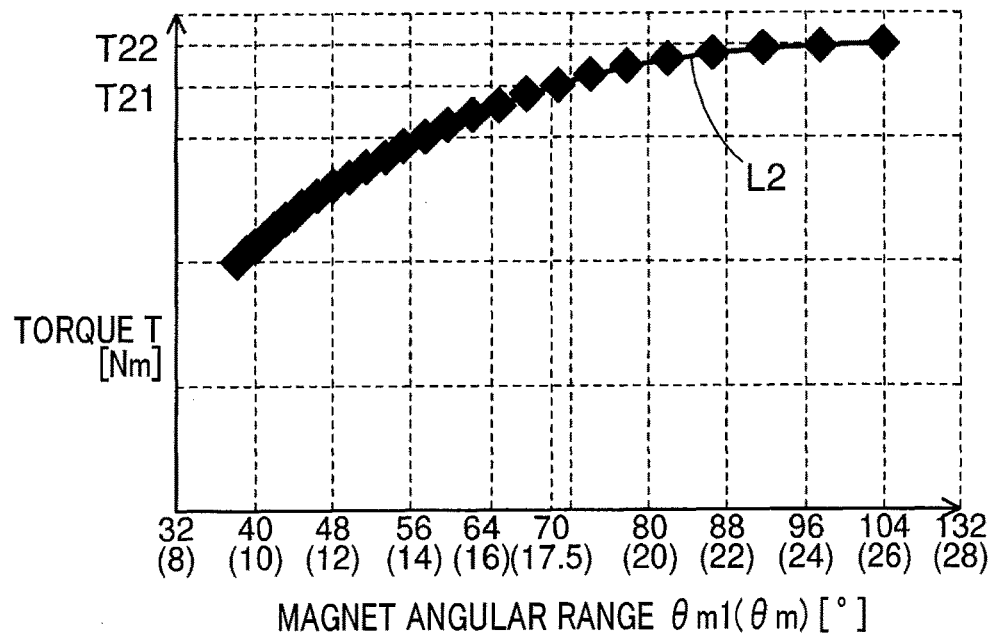
FIG. 6 is a graph illustrating the relationship between torque and magnet angular range.

In FIG. 6, the horizontal axis represents the magnet angular range θm1 (i.e., the angular range θm1 of each magnet 22 as shown in FIG. 1); the vertical axis represents the torque T generated by the rotating electric machine 10A; the characteristic line L2 represents the relationship between the magnet angular range θm1 and the torque T. Here, the magnet angular range θm1 is an example of magnet angular range θm according to the present invention.

In addition, in FIG. 6, the magnet angular range θm1 is indicated in electrical angle with the corresponding mechanical angle shown in parentheses. Moreover, there is satisfied the following relationship: mechanical angle=electrical angle×(2/the number of magnetic poles). Accordingly, in the rotating electric machine 10A, with the number of magnetic poles set to 8 (or the number of magnetic pole pairs set to 4), mechanical angle=electrical angle/4.

As can be seen from FIG. 6, when the magnet angular range θm1 is equal to 104° in electrical angle, the torque T is equal to a maximum value T22; when the magnet angular range θm1 is equal to 70° in electrical angle, the torque T is equal to a value T21 that is lower than T22. To improve the performance of the rotating electric machine 10A, it is preferable to set the magnet angular range θm1 to be greater than or equal to 70° in electrical angle.

On the other hand, as the magnet angular range θm1 increases above 104° in electrical angle, the soft-magnetic magnetic flux passages 21a decrease in circumferential width. Consequently, with the decrease in circumferential width of the soft-magnetic magnetic flux passages 21a, it becomes easy for magnetic saturation to occur in the stator teeth 32A due to concentration of the magnetic flux emanating from the magnets 22 on the stator teeth 32A; thus the amount of magnetic flux flowing between the rotor 20A and the stator 30A is limited.

Moreover, in the rotating electric machine 10A, there are provided three stator teeth 32A per magnetic pole. Accordingly, to allow one of the three stator teeth 32A to receive and send magnetic flux from and to the soft-magnetic magnetic flux passages 21a, it is preferable to set the magnet angular range θm1 to be in the range of 70° to 120° in electrical angle (i.e., $70° \leq θm1 \leq 120°$).

Figure 7:
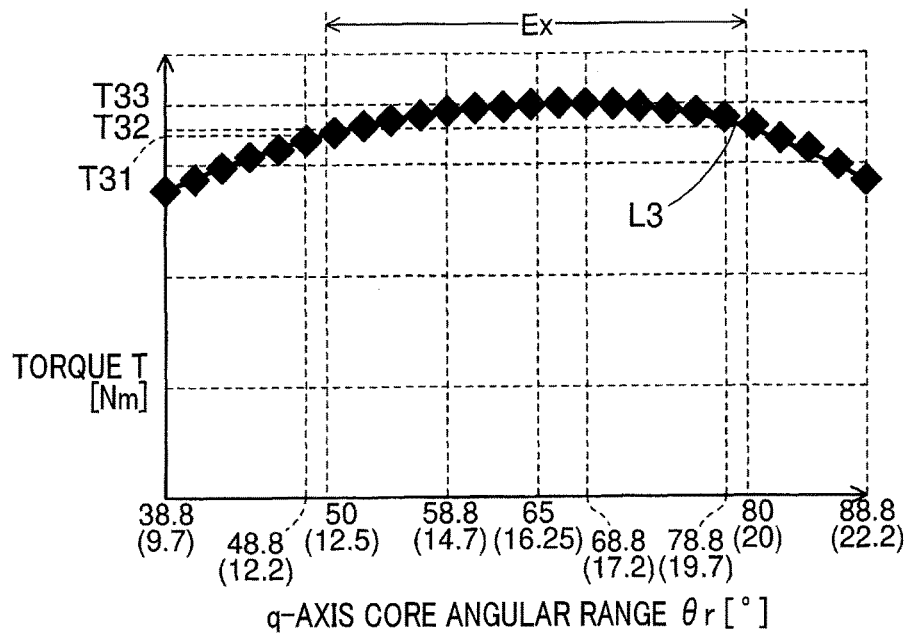
FIG. 7 is a graph illustrating the relationship between torque and q-axis core angular range.

In FIG. 7, the horizontal axis represents the q-axis core angular range θr (i.e., the angular range θr of each soft-magnetic magnetic flux passage 21a as shown in FIG. 1); the vertical axis represents the torque T generated by the rotating electric machine 10A; the characteristic line L3 represents the relationship between the q-axis core angular range θr and the torque T. In addition, in FIG. 7, the q-axis core angular range θr is indicated in electrical angle with the corresponding mechanical angle shown in parentheses.

As can be seen from FIG. 7, when the q-axis core angular range θr is equal to 65° in electrical angle, the torque T is equal to a maximum value T33; when the q-axis core angular range θr is equal to 50° in electrical angle, the torque T is equal to a value T31 that is lower than T33; when the q-axis core angular range θr is equal to 80° in electrical angle, the torque T is equal to a value T32 that is lower than T33. To improve the performance of the rotating electric machine 10A, it is preferable to set the q-axis core angular range θr to be in the range Ex of 50° to 80° in electrical angle (i.e., $50° \leq θr \leq 80°$).

According to the present embodiment, it is possible to achieve the following advantageous effects.

In the present embodiment, the outer rotor-type rotating electric machine 10A includes the rotor 20A and the stator 30A. The rotor 20A includes the magnets 22 each of which extends in the circumferential direction of the rotor 20A and is magnetized in the radial direction of the rotor 20A. The stator 30A is disposed radially inside the rotor 20A. The stator 30A has the stator teeth 32A formed in a radial pattern. Each of the stator teeth 32A has the inner circumferential width Wi at its radially inner end and the outer circumferential width Wo at its radially outer end. The inner circumferential width Wi and the outer circumferential width Wo are set so that Wi/Wo≥0.6.

With the above configuration, the entire magnetic circuit formed by opposing the rotor 20A and the stator 30A (i.e., the sum of the d-axis magnetic flux passages and the q-axis magnetic flux passages) is expanded so that the field magnetic flux can be supplied to the stator core 33 in a range of at least two of every three stator teeth 32A corresponding to one magnetic pole. Moreover, the slots 34A formed between the stator teeth 32A are shaped so as to be gradually narrowed radially inward, thereby reliably preventing radially inner end portions (or root portions) of the stator teeth 32A from being completely saturated. Consequently, it becomes possible to solve the technical problem occurring in the prior art, in other words, it becomes possible to increase the magnetic circuit area of the stator core 33 on the radially inner side (or the center side) of the stator 30A, thereby suppressing magnetic saturation of the stator core 33. As a result, for the same size, the performance of the outer rotor-type rotating electric machine 10A according to the present embodiment is considerably higher than that of an inner rotor-type rotating electric machine.

Moreover, in the present embodiment, the rotor 20A has the soft-magnetic magnetic flux passages 21a formed therein. Each of the soft-magnetic magnetic flux passages 21a is located between one circumferentially-adjacent pair of the magnets 22 and constitutes one magnetically-neutral non-polar auxiliary pole. The angular range θr of each of the soft-magnetic magnetic flux passages 21a (or the q-axis core angular range θr) is set to be in the range Ex of 50° to 80° in electrical angle. With the above configuration, it is possible to secure reluctance torque that is generated by the q-axis magnetic flux flowing from the stator 30A (more particularly, from the stator teeth 32A) to the non-polar auxiliary poles (i.e., the soft-magnetic magnetic flux passages 21a), thereby further enhancing the performance of the rotating electric machine 10A.

In the present embodiment, the angular range θm1 of each of the magnets 22 (or the magnet angular range θm1) is set to be greater than or equal to 70° in electrical angle.

Setting the angular range θm1 as above, in the rotor 20A which has a limited size, it is possible to allow each of the magnets 22 to cover, as one magnetic pole, a wide circumferential range. Consequently, it is possible to increase the opposing area between the magnets 22 and the stator teeth 32A, thereby suppressing magnetic saturation of the stator teeth 32A. Moreover, it is also possible to increase the amount of magnetic flux flowing between the magnets 22 and the stator teeth 32A, thereby considerably improving the performance of the rotating electric machine 10A.

In the present embodiment, the stator 30A has the slots 34A and the stator coil 31A. Each of the slots 34A is formed between one circumferentially-adjacent pair of the stator teeth 32A. The stator coil 31A is partially received in the slots 34A so as to have the coil end portions CE1 (or CE2) protruding outside the slots 34A on one axial side (or on the other axial side) of the slots 34A. The coil end portions CE1 (or CE2) of the stator coil 31A are assembled together so as to be arranged in alignment with each other.

With the above arrangement, it is possible to compactly wind the stator coil 31A, thereby minimizing the size of the entire stator 30A. Moreover, it is also possible to gain room for the magnetic circuit of the stator teeth 32A.

Second Embodiment

An outer rotor-type rotating electric machine 10B according to a second embodiment will be described with reference to FIGS. 8-10. This outer rotor-type rotating electric machine 10B is another example of the outer rotor-type rotating electric machine 10 according to the present invention.

Figure 8:
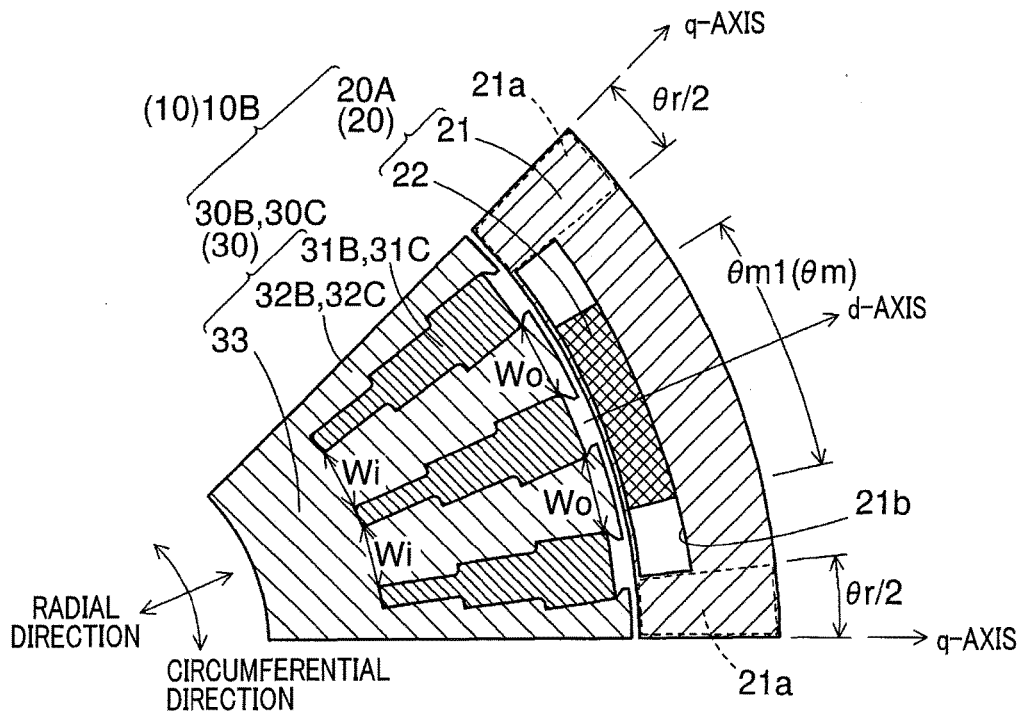
FIG. 8 is a schematic cross-sectional view illustrating the configuration of an outer rotor-type rotating electric machine according to a second embodiment.

As shown in FIG. 8, the rotating electric machine 10B includes a rotor 20A and a stator 30B or a stator 30C. That is, compared to the rotating electric machine 10A according to the first embodiment, the rotating electric machine 10B includes the stator 30B or the stator 30C instead of the stator 30A.

Either of the stators 30B and 30C is another example of the stator 30 according to the present invention.

Figure 9:
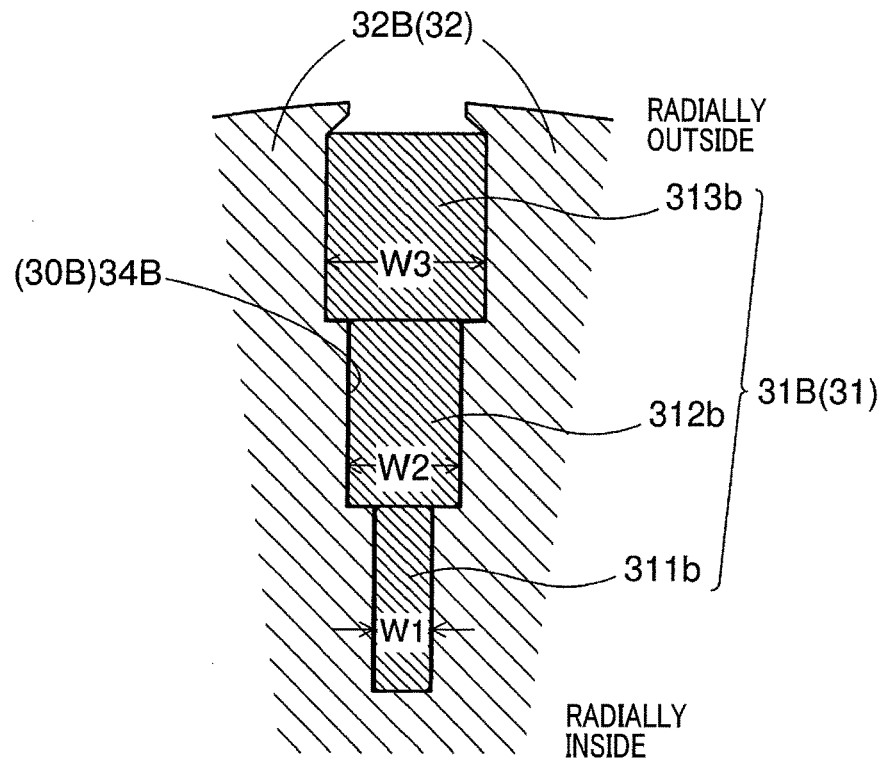
FIG. 9 is a schematic cross-sectional view illustrating a second example of configuring a stator coil.

As shown in FIG. 9, the stator 30B includes a multi-phase (e.g., three-phase) stator coil 31B and a stator core 33. The stator coil 31B is another example of the stator coil 31 according to the present invention. A plurality of stator teeth 32B are formed so as to extend radially outward from the stator core 33. The stator teeth 32B are another example of the stator teeth 32 according to the present invention. Between each circumferentially-adjacent pair of the stator teeth 32B, there is formed one slot 34B for receiving the stator coil 31B.

The stator coil 31B has a rectangular cross-sectional shape, unlike the stator coil 31A according to the first embodiment (see FIG. 2). In each of the slots 34B, the stator coil 31B is received in, for example, three layers. In the first layer, there is received a first portion (or radially innermost portion) 311b of the stator coil 31B. In the second layer, there is received a second portion (or radially intermediate portion) 312b of the stator coil 31B. In the third layer, there is received a third portion (or radially outermost portion) 313b of the stator coil 31B.

Each of the slots 34B is stepped to have the shape of stairs. Specifically, each of the slots 34B has a first portion (or radially innermost portion) for receiving the first portion 311b of the stator coil 31B, a second portion (or radially intermediate portion) for receiving the second portion 312b of the stator coil 31B, and a third portion (or radially outermost portion) for receiving the third portion 313b of the stator coil 31B. Each of the first, second and third portions has a rectangular cross section. Moreover, the first, second and third portions respectively have slot widths W1, W2 and W3 which are distances between one circumferentially-adjacent pair of the stator teeth 32B defining the slot 34B. The slot widths W1, W2 and W3 may be set to any suitable values. However, in terms of most effectively suppressing magnetic saturation of each of the stator teeth 32B, it is preferable to set the slot widths W1, W2 and W3 such that W1:W2:W3=1:2:3. In addition, the first, second and third portions 311b, 312b and 313b of the stator coil 31B are shaped in conformity with the shapes of the first, second and third portions of the slot 34B, thereby maximizing the space factor of the stator coil 31B in the slot 34B.

Furthermore, in the stator 30B, the radial heights (i.e., the heights in the vertical direction in FIG. 9) of the first, second and third portions 311b, 312b and 313b of the stator coil 31B are set to be equal to each other. Accordingly, the cross-sectional areas of the first, second and third portions 311b, 312b and 313b of the stator coil 31B are different from each other.

Figure 10:
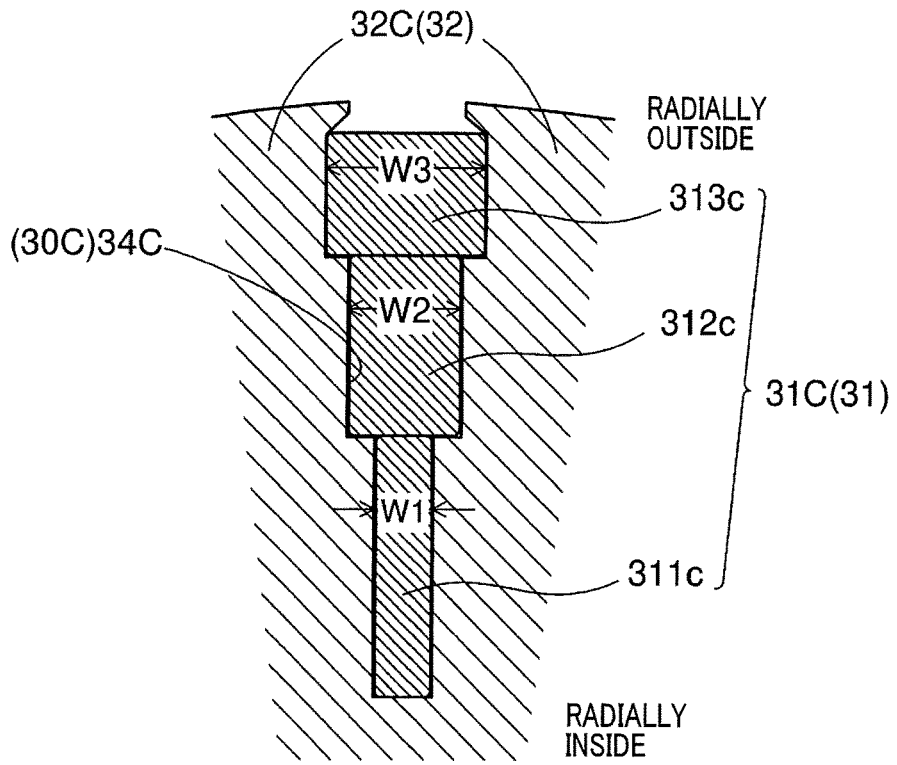
FIG. 10 is a schematic cross-sectional view illustrating a third example of configuring a stator coil.

On the other hand, as shown in FIG. 10, the stator 30C includes a multi-phase (e.g., three-phase) stator coil 31C and a stator core 33. The stator coil 31C is yet another example of the stator coil 31 according to the present invention. A plurality of stator teeth 32C are formed so as to extend radially outward from the stator core 33. The stator teeth 32C are yet another example of the stator teeth 32 according to the present invention. Between each circumferentially-adjacent pair of the stator teeth 32C, there is formed one slot 34C for receiving the stator coil 31C.

Similar to the above-described stator coil 31B, the stator coil 31C also has a rectangular cross-sectional shape. In each of the slots 34C, the stator coil 31C is received in, for example, three layers. In the first layer, there is received a first portion (or radially innermost portion) 311c of the stator coil 31C. In the second layer, there is received a second portion (or radially intermediate portion) 312c of the stator coil 31C. In the third layer, there is received a third portion (or radially outermost portion) 313c of the stator coil 31C.

Each of the slots 34C is stepped to have the shape of stairs. Specifically, each of the slots 34C has a first portion (or radially innermost portion) for receiving the first portion 311c of the stator coil 31C, a second portion (or radially intermediate portion) for receiving the second portion 312c of the stator coil 31C, and a third portion (or radially outermost portion) for receiving the third portion 313c of the stator coil 31C. Each of the first, second and third portions has a rectangular cross section. Moreover, the first, second and third portions respectively have slot widths W1, W2 and W3 which are distances between one circumferentially-adjacent pair of the stator teeth 32C defining the slot 34C. In terms of most effectively suppressing magnetic saturation of each of the stator teeth 32C, it is preferable to set the slot widths W1, W2 and W3 such that W1:W2:W3=1:2:3. In addition, the first, second and third portions 311c, 312c and 313c of the stator coil 31C are shaped in conformity with the shapes of the first, second and third portions of the slot 34C, thereby maximizing the space factor of the stator coil 31C in the slot 34C.

However, unlike in the stator 30B, in the stator 30C, the radial heights (i.e., the heights in the vertical direction in FIG. 10) of the first, second and third portions 311c, 312c and 313c of the stator coil 31C are set so that the cross-sectional areas of the three portions 311c, 312c and 313c are equal to each other. Consequently, it becomes difficult for a difference in characteristics (e.g., allowable electric current and resistance value) to occur between the three portions 311c, 312c and 313c of the stator coil 31C.

According to the present embodiment, it is possible to achieve the same advantageous effects as the first embodiment.

Moreover, according to the present embodiment, each of the slots 34B (or 34C) is stepped to have the shape of stairs. Consequently, it is possible to allow the stator coil 31B (31C) to have a rectangular cross-sectional shape, thereby improving the space factor of the stator coil 31B (or 31C) in the slots 34B (or 34C). In addition, since the stator coil 31B (or 31C) with the rectangular cross-sectional shape can be compactly received in the slots 34B (or 34C), it is possible to provide room for the magnetic circuit of the stator teeth 32B (or 32C).

Furthermore, according to the present embodiment, for each of the slots 34B (or 34C), the slot widths W1, W2 and W3 of the first, second and third portions of the slot 34B (or 34C) are set such that W1:W2:W3=1:2:3. Consequently, it is possible to mostly effectively suppress magnetic saturation of each of the stator teeth 32B (or 32C).

Third Embodiment

An outer rotor-type rotating electric machine 10C according to a third embodiment will be described with reference to FIGS. 11-13. This outer rotor-type rotating electric machine 10C is yet another example of the outer rotor-type rotating electric machine 10 according to the present invention. As shown in FIG. 1, the rotating electric machine 10C includes a rotor 20B and a stator 30A. That is, compared to the rotating electric machine 10A according to the first embodiment, the rotating electric machine 10C includes the rotor 20B instead of the rotor 20A.

The rotor 20B is another example of the rotor 20 according to the present invention. The rotor 20B differs from the rotor 20A according to the first embodiment in the magnet angular range (or pole arc angle). Specifically, in the rotor 20A, the magnet angular range (i.e., the angular range of each magnet 22) is equal to θm1; in the rotor 20B, the magnet angular range is equal to θm2 that is greater than θm1 (i.e., θm2>θm1). Accordingly, the rotor 20B differs from the rotor 20A also in the magnet mass (i.e., the mass of each magnet 22).

Figure 12:
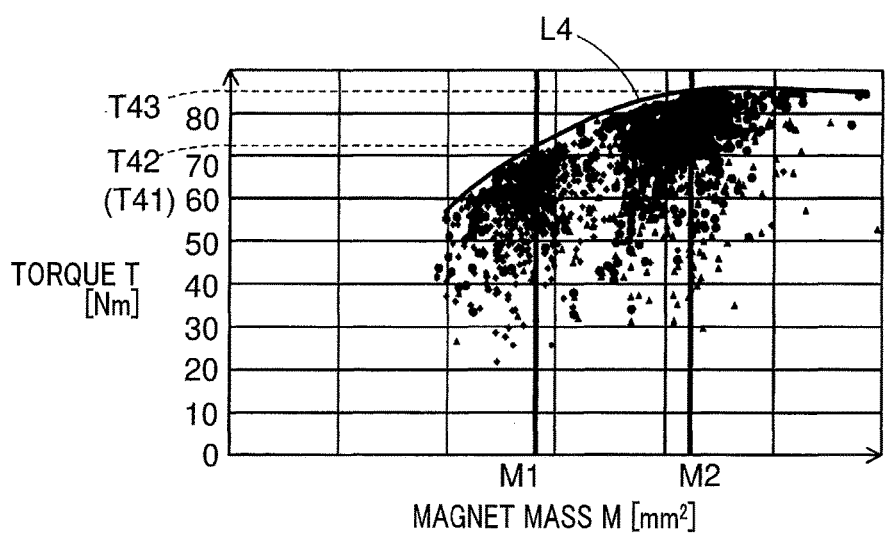
FIG. 12 is a graph illustrating the relationship between torque and magnet mass.

FIG. 12 illustrates the relationship between the torque T and the magnet mass M. The characteristic line L4 in FIG. 12 is obtained by plotting the torque T measured while varying the magnet mass M and connecting the maximum values of the measured torque T. Moreover, in FIG. 12, M1 represents the magnet mass in the rotor 20A according to the first embodiment, while M2 represents the magnet mass in the rotor 20B according to the present embodiment.

In addition, with the axial length of each magnet 22 being constant, the magnet mass is directly proportional to the cross-sectional area of each magnet 22. Therefore, for the sake of convenience, in FIG. 12, the magnet mass is indicated by the cross-sectional area of each magnet 22 in the unit of mm².

As can be seen from FIG. 12, at the magnet mass M1, the torque T is, at a maximum, equal to a value T42; at the magnet mass M2, the torque T is, at a maximum, equal to a value T43 that is higher than T42 (i.e., T43>T42). In comparison, at the magnet mass M1, the torque of a conventional outer rotor-type rotating electric machine is, at a maximum, equal to T41 that is lower than T42 (i.e., T41<T42<T43). Accordingly, it has been made clear that the rotating electric machines 10 (10A-10C) according to the present invention are improved in performance in comparison with the conventional rotating electric machine.

Table 1 shows an example of low-speed torque. Table 2 shows an example of high-speed torque. The data shown in Table 1 and Table 2 are extracted from FIG. 12. In the case of low-speed torque, the number N of revolutions is set to different basic numbers of revolutions for different machines. In the case of high-speed torque, the number N of revolutions is set to be constant at 10000 rpm.

In addition, it should be noted that the data shown in Table 1 and Table 2 are only examples and the same results are obtainable at different conditions.

TABLE 1

| | LOW-SPEED TORQUE | | | BASIC NUMBER OF REVOLUTIONS NUMBER OF |
|---|---|---|---|---|
| MAGNET MASS | CURRENT (Arms) | PHASE (degE) | TORQUE (Nm) | REVOLUTIONS (rpm) |
| M1 (20A) | 150 | 36 | 71 | 3700 |
| M2(20B) | 150 | 37 | 85 | 3750 |
| CONVEN-TIONAL | 150 | 50 | 60 | 4000 |

TABLE 2

| | HIGH-SPEED TORQUE: 10000 (rpm) | | |
|---|---|---|---|
| MAGNET MASS | CURRENT (Arms) | PHASE (degE) | TORQUE (Nm) |
| M1 (20A) | 130 | 78 | 26 |
| M2(20B) | 130 | 77 | 31 |
| CONVENTIONAL | 130 | 75 | 22 |

Figure 13:
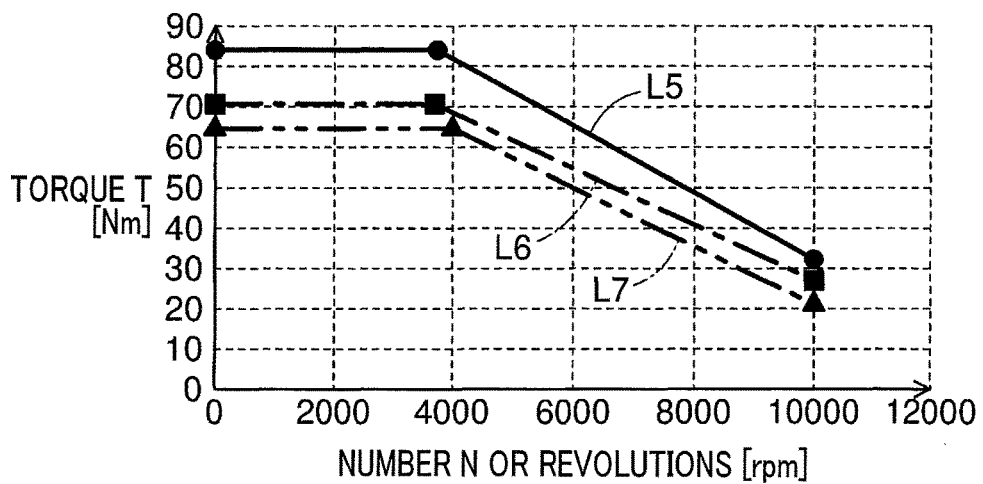
FIG. 13 is a graph illustrating the relationship between torque and the number of revolutions.

FIG. 13 illustrates the relationship between the torque T and the number N of revolutions. In FIG. 13, the characteristic line L5 (continuous line) is obtained by measuring the torque T of the rotating electric machine 10C, where the magnet mass is M2, while varying the number N of revolutions. The characteristic line L6 (one-dot chain line) is obtained by measuring the torque T of the rotating electric machine 10A, where the magnet mass is M1, while varying the number N of revolutions. The characteristic line L7 (two-dot chain line) is obtained by measuring the torque T of the conventional rotating electric machine, where the magnet mass is M1, while varying the number N of revolutions.

As can be seen from FIG. 13, the rotating electric machines 10A and 10C according to the present invention are improved in performance over the entire range of the number N of revolutions in comparison with the conventional rotating electric machine. Moreover, the torque T increases with the magnet mass M.

While the above particular embodiments have been shown and described, it will be understood by those skilled in the art that various modifications, changes, and improvements may be made without departing from the spirit of the present invention.

(1) In the above-described embodiments, in each of the slots 34, the stator coil 31 is received in three layers and has three different cross-sectional shapes respectively in the three layers (see FIGS. 2 and 9-10).

However, the stator coil 31 may be received in two or four layers in each of the slots 34. Moreover, the stator coil 31 may have the same cross-sectional shape and the same cross-sectional area in at least two of the layers.

Figure 14:
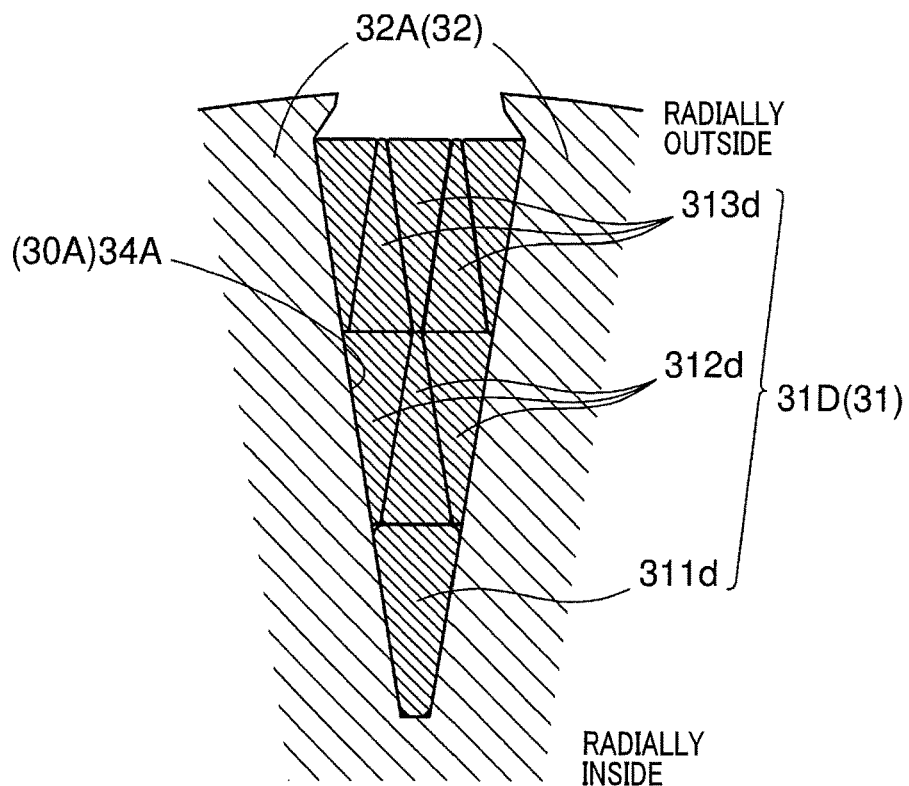
FIG. 14 is a schematic cross-sectional view illustrating a fourth example of configuring a stator coil.

For example, in the stator 30A according to the first embodiment, a stator coil 31D (see FIG. 14) may be employed instead of the stator coil 31A (see FIG. 2). Specifically, in this case, as shown in FIG. 14, in each of the slots 34A, in the first layer, there is received a first portion 311d of the stator coil 31D. In the second layer, there are received three second portions 312d of the stator coil 31D. In the third layer, there are received five third portions 313d of the stator coil 31D. Among the first to the third portions 311d-313d of the stator coil 31D, at least the second and third portions 312d and 313d have the same cross-sectional shape and the same cross-sectional area.

Figure 15:
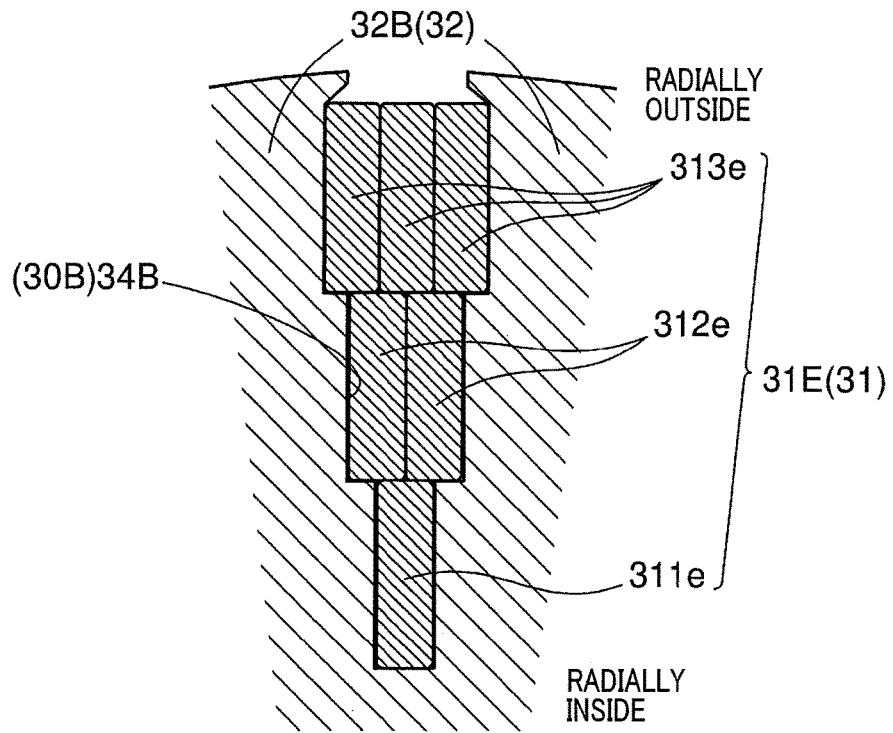
FIG. 15 is a schematic cross-sectional view illustrating a fifth example of configuring a stator coil.

Moreover, in the stator 30B according to the second embodiment, a stator coil 31E (see FIG. 15) may be employed instead of the stator coil 31B (see FIG. 9). Specifically, in this case, as shown in FIG. 15, in each of the slots 34B, in the first layer, there is received a first portion 311e of the stator coil 31E. In the second layer, there are received two second portions 312e of the stator coil 31E. In the third layer, there are received three third portions 313e of the stator coil 31E. All of the first, second and third portions 311e, 312e and 313e of the stator coil 31E have the same rectangular cross-sectional shape and the same cross-sectional area.

Figure 16:
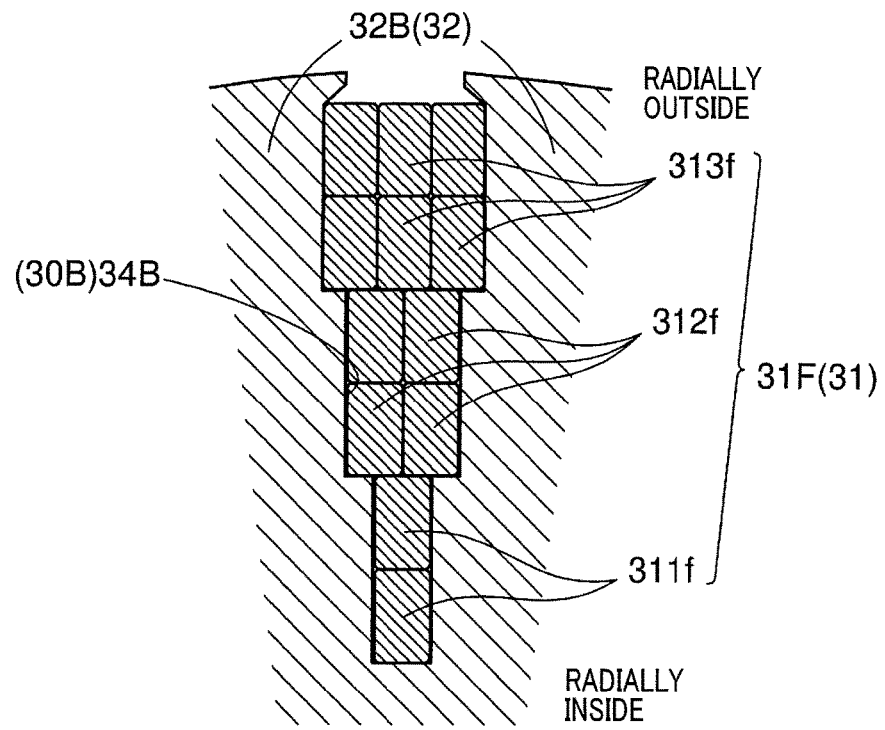
FIG. 16 is a schematic cross-sectional view illustrating a sixth example of configuring a stator coil.

Alternatively, in the stator 30B according to the second embodiment, a stator coil 31F (see FIG. 16) may also be employed instead of the stator coil 31B (see FIG. 9). Specifically, in this case, as shown in FIG. 16, in each of the slots 34B, in the first layer, there are received two first portions 311f of the stator coil 31F in two sub-layers. In the second layer, there are received four second portions 312f of the stator coil 31F in two sub-layers. In the third layer, there are received six third portions 313f of the stator coil 31F in two sub-layers. Accordingly, the stator coil 31F can also be regarded as being received in a total of six layers in each of the slots 34B. Moreover, in this case, all of the first, second and third portions 311f, 312f and 313f of the stator coil 31F have the same rectangular cross-sectional shape and the same cross-sectional area.

(2) In the first embodiment, the rotating electric machine 10A includes the rotor 20A and the stator 30A (see FIG. 1). In the second embodiment, the rotating electric machine 10B includes the rotor 20A and the stator 30B or the stator 30C (see FIG. 8). In the third embodiment, the rotating electric machine 10C includes the rotor 20B and the stator 30A (see FIG. 11).

However, the rotating electric machines 10A and 10B may be modified to include the rotor 20B instead of the rotor 20A. Moreover, the rotating electric machine 10C may be modified to include the stator 30B or the stator 30C instead of the stator 30A.

(3) In the second embodiment, the number of steps formed in each of the slots 34B or 34C is equal to 2 (see FIGS. 9-10). However, it is also possible to form three or more steps in each of the slots 34B or 34C.

Figure 11:
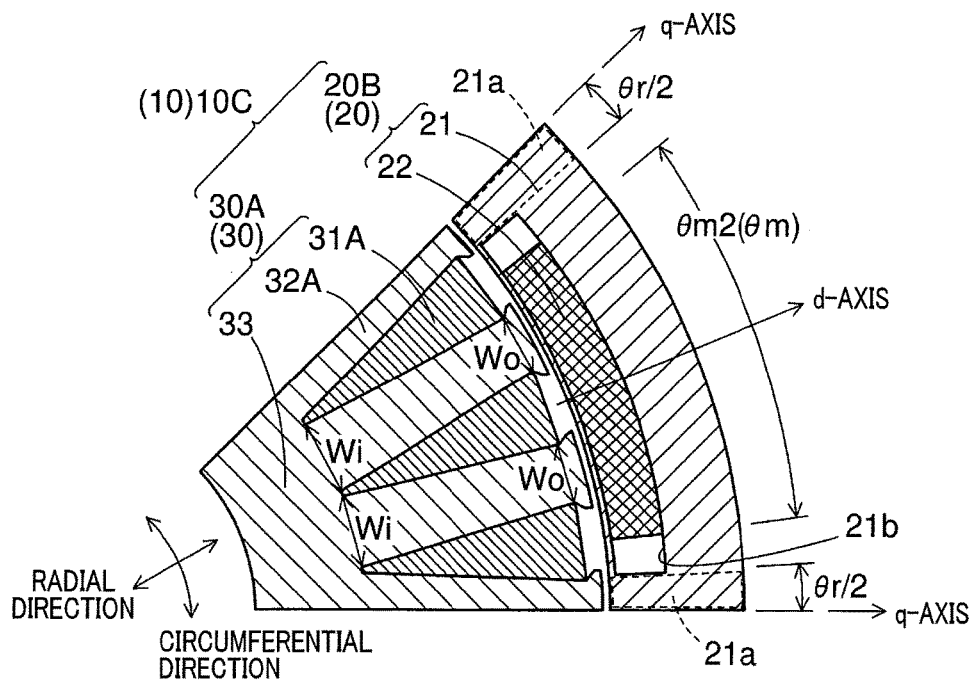
FIG. 11 is a schematic cross-sectional view illustrating the configuration of an outer rotor-type rotating electric machine according to a third embodiment.

(4) In the above-described embodiments, each of the magnets 22 is formed into a single piece (see FIGS. 1, 8 and 11). However, each of the magnets 22 may also be comprised of a plurality of magnet segments.

(5) In the above-described embodiments, for each of the magnets 22, there is provided a bridge portion of the rotor 20 radially inside the magnet 22 to hold the magnet 22; the bridge portion circumferentially extends to connect the pair of soft-magnetic magnetic flux passages 21a respectively on opposite circumferential sides of the magnet 22 (see FIGS. 1, 8 and 11).

However, the bridge portion may be omitted from the rotor provided that the magnet 22 is firmly fixed in the corresponding receiving portion 21b of the rotor 20. In addition, in this case, the magnet 22 may be fixed by any suitable fixing means. For example, the magnet 22 may be fixed by an adhesive to a radially outer wall surface of the corresponding receiving portion 21b of the rotor 20.

(6) In the above-described embodiments, the number of magnetic poles is set to 8 (or the number of magnetic pole pairs is set to 4). However, the number of magnetic poles (or the number of magnetic pole pairs) may be set to any other suitable value.

(7) In the above-described embodiments, the stator coil 31 is formed of the U-shaped electric conductor segments (see FIG. 3). Moreover, the coil end portions CE1 of the stator coil 31, each of which is constituted of the bottom portion of one of the U-shaped electric conductor segments, are assembled together so as to be arranged in circumferential alignment with each other (see FIG. 4).

However, the stator coil 31 may be formed of electric conductor segments without a U-shape, and the electric conductor segments may be joined to one another on both axial sides of the stator core 30. In this case, the coil end portions CE1 of the stator coil 31, which are constituted of end portions of the electric conductor segments protruding outside the slots 34 on one axial side of the stator core 33, may be preferably assembled together so as to be arranged in circumferential alignment with each other. The coil end portions CE2 of the stator coil 31, which are constituted of end portions of the electric conductor segments protruding outside the slots 34 on the other axial side of the stator core 33, may be preferably assembled together so as to be arranged in circumferential alignment with each other.

What is claimed is:

1. An outer rotor-type rotating electric machine comprising:
    a rotor including a plurality of magnets each of which extends in a circumferential direction of the rotor and is magnetized in a radial direction of the rotor; and
    a stator disposed radially inside the rotor, the stator having a plurality of stator teeth formed in a radial pattern,
    wherein
    each of the stator teeth has an inner circumferential width at its radially inner end and an outer circumferential width at its radially outer end, and
    $Wi/Wo \geq 0.6$, where Wi is the inner circumferential width and Wo is the outer circumferential width,
    in the rotor, there are formed a plurality of soft-magnetic q-axis magnetic flux passages along which q-axis magnetic flux flows,
    each of the soft-magnetic q-axis magnetic flux passages is located between one circumferentially-adjacent pair of the magnets and constitutes one magnetically-neutral non-polar auxiliary pole, and
    an angular range of each of the soft-magnetic q-axis magnetic flux passages is set to be in a range of 50° to 80° in electrical angle.

2. The outer rotor-type rotating electric machine as set forth in claim 1, wherein an angular range of each of the magnets is set to be greater than or equal to 70° in electrical angle.

3. The outer rotor-type rotating electric machine as set forth in claim 1, wherein the stator has a plurality of slots and a stator coil,
    each of the slots is formed between one circumferentially-adjacent pair of the stator teeth,
    the stator coil is partially received in the slots so as to have a plurality of coil end portions protruding outside the slots on an axial side of the slots, and
    the coil end portions of the stator coil are assembled together so as to be arranged in alignment with each other.

4. The outer rotor-type rotating electric machine as set forth in claim 1, wherein the stator has a plurality of slots each of which is formed between one circumferentially-adjacent pair of the stator teeth, and
    each of the slots is stepped to have the shape of stairs.

5. The outer rotor-type rotating electric machine as set forth in claim 4, wherein each of the slots has first, second and third portions which are sequentially located in this order in a direction from a radially inside to a radially outside of the slot,
    the first, second and third portions respectively have slot widths W1, W2 and W3 which are distances between one circumferentially-adjacent pair of the stator teeth defining the slot, and
    the slot widths W1, W2 and W3 are set such that W1:W2:W3=1:2:3.

6. The outer rotor-type rotating electric machine as set forth in claim 1, wherein $1 < Wi/Wo \leq 1.8$.

* * * * *